United States Patent
Smarsly et al.

(10) Patent No.: US 8,882,442 B2
(45) Date of Patent: Nov. 11, 2014

(54) COMPONENT FOR A GAS TURBINE AND A METHOD FOR THE PRODUCTION OF THE COMPONENT

(75) Inventors: Wilfried Smarsly, Munich (DE); Joachim Bamberg, Dachau (DE); Joerg Esslinger, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 840 days.

(21) Appl. No.: 12/998,411

(22) PCT Filed: Oct. 14, 2009

(86) PCT No.: PCT/DE2009/001429
§ 371 (c)(1),
(2), (4) Date: Sep. 6, 2011

(87) PCT Pub. No.: WO2010/043209
PCT Pub. Date: Apr. 22, 2010

(65) Prior Publication Data
US 2011/0305578 A1      Dec. 15, 2011

(30) Foreign Application Priority Data
Oct. 18, 2008   (DE) .......................... 10 2008 052 247

(51) Int. Cl.
*F01D 5/34* (2006.01)
*B23K 20/12* (2006.01)
*B23P 15/00* (2006.01)

(52) U.S. Cl.
CPC .............. *F01D 5/34* (2013.01); *B23K 20/1205* (2013.01); *B23P 15/006* (2013.01); *B23K 2201/001* (2013.01); *B23K 2203/14* (2013.01); *F05B 2230/239* (2013.01); *F05C 2201/0466* (2013.01); *F05D 2230/50* (2013.01); *F05D 2300/133* (2013.01)

USPC .......... 415/12; 415/200; 416/239; 416/241 R; 29/889.71; 29/525.14

(58) Field of Classification Search
USPC ........ 415/12, 200; 416/239, 248, 234, 241 R; 428/660, 680, 610; 228/112.1, 2.1; 29/889.71, 525.14
See application file for complete search history.

(56) References Cited

U.S. PATENT DOCUMENTS

| 2,831,958 A | 4/1958 | Richardson .................. 219/132 |
| 3,088,192 A * | 5/1963 | Turner ..................... 29/889.721 |

(Continued)

FOREIGN PATENT DOCUMENTS

| DE | 2510286 A1 | 9/1976 |
| DE | 38 84 893 T2 | 2/1994 |

(Continued)

OTHER PUBLICATIONS

English Machine Translation of DE 10 2009 058 898 A1.*

*Primary Examiner* — Edward Look
*Assistant Examiner* — Wayne A Lambert
(74) *Attorney, Agent, or Firm* — Davidson, Davidson & Kappel, LLC

(57) ABSTRACT

A component for a gas turbine, especially a blisk or a bling, whereby the component includes a rotor base (12) made of a high temperature-resistant nickel alloy and a plurality of turbine blades (14) joined to the rotor base, whereby each turbine blade includes a rotor blade (16) made of a titanium alloy and a blade root. The blade root is configured as an adapter element (18) that is made of a material that can be welded to the titanium alloy as well as to the high temperature-resistant nickel alloy and that is integrally joined to the rotor base (12) and to the rotor blade (16) fusion. A method for the production of the component is also described.

19 Claims, 3 Drawing Sheets

(56) References Cited

U.S. PATENT DOCUMENTS

| | | | | |
|---|---|---|---|---|
| 3,776,704 | A | * | 12/1973 | Benjamin .................... 75/229 |
| 4,294,615 | A | * | 10/1981 | Blackburn et al. ............ 420/420 |
| 4,581,300 | A | * | 4/1986 | Hoppin et al. ................ 428/546 |
| 4,964,564 | A | * | 10/1990 | Neal et al. .................... 228/107 |
| 5,028,491 | A | * | 7/1991 | Huang et al. ................. 428/614 |
| 5,073,459 | A | * | 12/1991 | Smarsly et al. .............. 428/550 |
| 5,268,235 | A | * | 12/1993 | Lashmore et al. ............ 428/610 |
| 5,318,214 | A | * | 6/1994 | Lucas et al. .................. 228/121 |
| 5,318,406 | A | * | 6/1994 | Bardes ..................... 416/223 A |
| 5,354,623 | A | * | 10/1994 | Hall ............................. 428/610 |
| 5,368,661 | A | * | 11/1994 | Nakamura et al. ............ 148/512 |
| 5,431,752 | A | * | 7/1995 | Brogle et al. ................. 148/516 |
| 5,525,779 | A | * | 6/1996 | Santella et al. ....... 219/137 WM |
| 5,741,604 | A | * | 4/1998 | Deakin et al. ................ 428/660 |
| 5,916,382 | A | * | 6/1999 | Sato et al. .................... 148/404 |
| 6,037,066 | A | * | 3/2000 | Kuwabara .................... 428/610 |
| 6,291,086 | B1 | * | 9/2001 | Nguyen-Dinh ............... 428/660 |
| 6,455,167 | B1 | * | 9/2002 | Rigney et al. ................ 428/472.2 |
| 6,524,072 | B1 | * | 2/2003 | Brownell et al. ......... 416/213 R |
| 6,589,668 | B1 | * | 7/2003 | Braithwaite et al. ......... 428/610 |
| 7,021,519 | B2 | | 4/2006 | Foster et al. ................ 228/112.1 |
| 7,125,227 | B2 | * | 10/2006 | Adde et al. ............... 416/213 R |
| 7,156,282 | B1 | * | 1/2007 | Renaud et al. ............... 228/122.1 |
| 7,967,182 | B2 | * | 6/2011 | Nojiri et al. ................ 228/112.1 |
| 2003/0223873 | A1 | * | 12/2003 | Carrier ..................... 416/213 R |
| 2004/0146640 | A1 | * | 7/2004 | Ott et al. ........................ 427/180 |
| 2005/0084381 | A1 | * | 4/2005 | Groh et al. ................ 416/244 A |
| 2005/0227105 | A1 | * | 10/2005 | Jiang et al. ................... 428/660 |
| 2005/0274010 | A1 | * | 12/2005 | Rawson et al. ............... 29/889.1 |
| 2006/0067832 | A1 | * | 3/2006 | Groh et al. ................ 416/244 A |
| 2007/0141298 | A1 | * | 6/2007 | Bamberg et al. ............ 428/66.6 |
| 2007/0181539 | A1 | * | 8/2007 | Richter ........................... 219/98 |
| 2007/0281175 | A1 | * | 12/2007 | Hoffmann et al. ............ 428/457 |
| 2008/0069720 | A1 | | 3/2008 | Renkel et al. ................. 420/418 |
| 2008/0107531 | A1 | * | 5/2008 | Chou et al. ................ 416/213 R |
| 2008/0107532 | A1 | * | 5/2008 | Carrier et al. ............. 416/213 R |
| 2008/0176063 | A1 | * | 7/2008 | Lin et al. ....................... 428/328 |
| 2009/0050675 | A1 | | 2/2009 | Baur et al. ................. 228/114.5 |
| 2009/0068016 | A1 | * | 3/2009 | Perron et al. .............. 416/213 R |
| 2009/0108051 | A1 | * | 4/2009 | Bamberg et al. ........... 228/112.1 |
| 2009/0113708 | A1 | | 5/2009 | Bamberg et al. .......... 29/889.21 |
| 2010/0068556 | A1 | * | 3/2010 | Lemmon et al. ............. 428/632 |
| 2010/0233501 | A1 | * | 9/2010 | Messer et al. ................ 428/586 |
| 2010/0284817 | A1 | | 11/2010 | Bamberg et al. ......... 416/241 R |

FOREIGN PATENT DOCUMENTS

| | | | |
|---|---|---|---|
| DE | 10 2004 022 578 A1 | | 12/2005 |
| DE | 10 2005 015 947 B3 | | 7/2006 |
| DE | 10 2005 019 356 A1 | | 9/2006 |
| DE | 10 2007 050 142 | | 4/2009 |
| DE | 102009058898 A1 | * | 6/2011 |
| EP | 0305113 B1 | | 10/1993 |
| EP | 10 02 935 A1 | | 5/2000 |
| EP | 1462621 A1 | * | 9/2004 |
| EP | 1526252 A2 | | 4/2005 |
| EP | 1698423 A1 | | 9/2006 |
| GB | 1497360 A | | 1/1978 |

\* cited by examiner

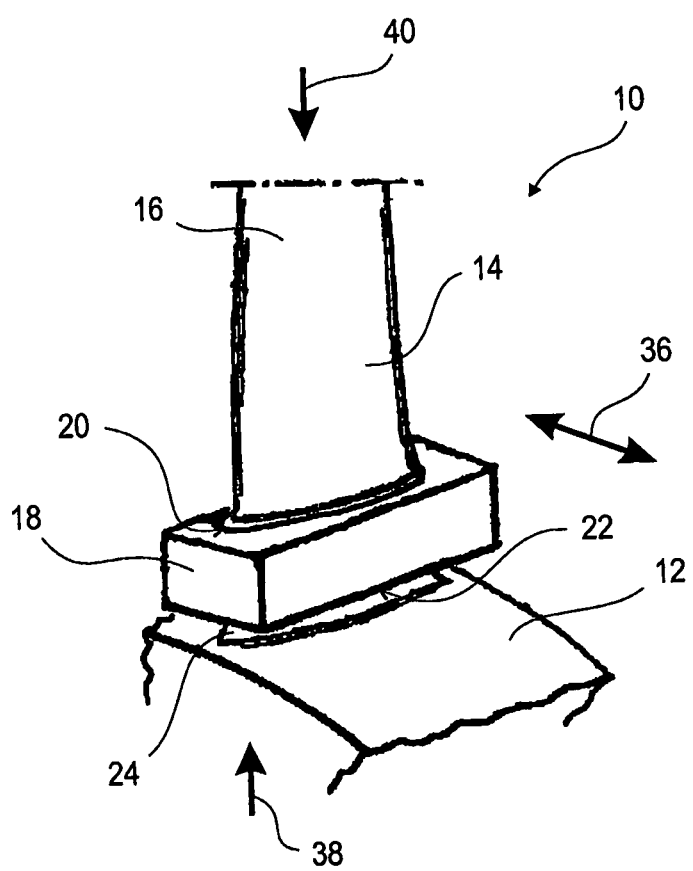

COMPONENT FOR A GAS TURBINE AND A METHOD FOR THE PRODUCTION OF THE COMPONENT

The invention relates to a component for a gas turbine as well as to a method for the production of the component.

Gas turbine rotors have a rotor base as well as several turbine blades that rotate together with the rotor base. The turbine blades can either be an integral part of the rotor base or else they can be anchored by means of blade roots in one or more grooves in the rotor base. Rotors with integrated blades are referred to as blisks or blings, depending on whether the rotor base is disk-shaped or ring-shaped.

BACKGROUND

German patent application DE 10 2005 019 356 A1 discloses a method for joining a turbine blade to a rotor base during the production or repair of a gas turbine rotor with integrated blades by means of friction welding. In friction welding, components are fused together by friction and integrally joined to each other. In linear friction welding, one component is moved back and forth translatorily, while the other component is stationary and it is pressed with a certain amount of force against the moving component. In this process, the mating faces of the components that are to be joined together adapt to each other as a result of hot forging. The method described in the state of the art entails the two components that are to be joined or fused to each other, that is to say, the rotor base and the turbine blades as well as another mating part as an adapter element. The two components that are to be joined and the adapter element are oriented with respect to each other in such a way that the adapter element is arranged as an insert between the two components. In order to join the components, the adapter element is moved relative to the two components, a process in which an upset force is exerted via the stationary components onto the joining zones between the components and the adapter element.

By means of the described method, a gas turbine rotor with integrated blades can be produced in the form of a blisk or bling relatively easily. However, the components to be joined and the adapter element have to be made of the same material. If the rotor base and the turbine blades are made of a titanium-based alloy, the adapter element employed is likewise made of a titanium-based alloy.

Up until now, it has not been possible to create a hybrid or graduated blisk design for a gas turbine rotor in which the rotor base is made of a high temperature-resistant nickel alloy such as, for instance, Inconel 718, while the turbine blades are made of a TiAl alloy since, at the working temperature of about 650° C. [1202° F.], the material used for the blades, especially the aluminum, diffuses into the joining zone or into the material used for the rotor base. This changes the chemical composition of the rotor base and of the turbine blades in the joining zone in such a way as to form a new material state with new phases. This phase formation, however, reduces the reliability and service life of the joining zone. The durability of the component joint is also detrimentally affected by the different thermal expansion of the materials.

SUMMARY OF THE INVENTION

It is an object of the present invention to provide a novel component for a gas turbine having a hybrid blisk design.

The present invention provides a component comprising a rotor base made of a high temperature-resistant nickel alloy and a plurality of turbine blades joined to the rotor base, each turbine blade comprising a rotor made of a titanium alloy and having a blade root. The blade root is configured as an adapter element that is made of a material that can be welded to the titanium alloy as well as to the high temperature-resistant nickel alloy, whereby the adapter element is integrally connected to the rotor base and to the rotor blade by means of fusion.

Therefore, the invention makes it possible to implement the extremely lightweight blisk design of hybrid gas turbine rotors, for instance, according to the method described in German patent application DE 10 2005 019 356 A1, which employs lightweight TiAl blades and a rotor base made of a high temperature-resistant material that can withstand very high loads. Since the joining zones on the adapter element are always adjacent to materials that have the same or a similar composition, diffusion processes that lead to the formation of brittle phases can be reliably prevented. Consequently, the connection of the adapter element to the rotor blade or to the rotor base is sufficiently reliable and has a long service life. The quality of the joining zones on the adapter element can be reliably monitored by means of non-destructive testing.

The titanium alloy of the rotor blade is preferably selected from among the group of titanium-based alloys and from the TiAl alloys. Preferably, the rotor blade is made of a TiAl alloy containing titanium, aluminum and niobium, with the aluminum content being between 35% and 60% by weight and the niobium content ranging from 2% to 16% by weight, as described in German patent application DE 10 2004 022 578 A1. Special preference is given to the titanium alloy $Ti_{44}Al_5Nb$ (at %).

The high temperature-resistant nickel alloy for the rotor base is preferably a nickel superalloy such as, for instance, Inconel 718, containing 50% to 55% Ni, 17% to 21% Cr, smaller fractions of Nb/Ta, Mo, Ti, Al as well as other trace elements and, for the rest, iron. The nickel superalloys stand out for their corrosion resistance and fatigue resistance at high temperatures. Other nickel superalloys and nickel-based alloys known from the state of the art can likewise be employed.

According to a first embodiment of the invention, an adapter element having a two-part structure is provided. The adapter element has at least a first layer consisting of the high temperature-resistant nickel alloy used for the rotor base, and at least a second layer consisting of the titanium alloy used for the rotor blade. Between the first and the second layers, there is an interlayer that functions as a diffusion barrier for elements that form brittle phases, especially aluminum.

The interlayer is preferably made up of a matrix alloy with metal particles uniformly distributed in it. The matrix alloy consists of a high temperature-resistant nickel alloy such as, for example, Inconel 718, or of a TiAl alloy of the type also used for the rotor base or for the rotor blade. The metal particles preferably consist of alloys of refractory metals and/or platinum metals.

Especially preferably, the metal particles consist of alloys containing 2% to 60% by weight of aluminum and, for the rest, at least a second metal from the group consisting of rhenium, iridium, ruthenium, platinum, tantalum, niobium, molybdenum and tungsten. Another preferred composition of the metal particles comprises 2% to 40% by weight of aluminum, 5% to 20% by weight of a metal from the group consisting of nickel, cobalt, vanadium and chromium and, for the rest, at least one metal from the group consisting of rhenium, iridium, ruthenium, platinum, tantalum, niobium, molybdenum and tungsten.

The metal particles preferably have a mean size ranging from 0.1 μm to 200 μm and are preferably contained in the metal matrix in an amount of 5% to 45% by volume. Especially preferably, the metal particles are completely surrounded by the matrix alloy, so that no metal particles are present on the surface of the interlayer. The thickness of the interlayer is preferably between 0.5 mm and 2 mm.

The interlayer can be produced by means of conventional methods employed in powder metallurgy, for instance, through the sintering of powders from the matrix alloy and the metal particles. In this process, the sintering can be carried out in any way known to the person skilled in the art, for example, employing lasers, electron rays or the direct passage of current, in each case with or without applying pressure. Layered sintering is likewise possible, as a result of which graduated structures can be created.

Incorporating the metal particles into the matrix alloy first increases the lattice tension in the matrix and reduces the lattice vacancies. This reduces the diffusion rate of the atoms that diffuse through the interlayer. Moreover, the metal particles distributed in the matrix alloy can pick up the aluminum and titanium molecules that are diffusing out of the titanium alloy of the second layer of the adapter element or of the rotor blade, either in dissolved form or bonded as intermetallic phases. Owing to the low mobility of the atoms of the refractory metals or of the platinum metals and owing to the formation of intermetallic phases, the metal particles are very stable at temperatures of up to 800° C. [1472° F.]. In this manner, the diffusion of the titanium and aluminum through the interlayer is greatly hindered at the working temperature, and the formation of intermetallic phases is reduced in the first layer of the adapter element made of a high temperature-resistant nickel alloy. As a consequence, the strength of the rotor base stays within the permissible limits.

According to a second embodiment of the invention, the adapter element has a graduated structure, whereby the composition of the adapter element changes gradually or continuously from the material used for the rotor base, for instance, Inconel 718, to the material used for the rotor blade, for example, $Ti_{44}Al_5Nb$. Such an adapter element can be produced, for example, by means of laser powder-deposit welding or other methods known in powder metallurgy. The adapter element according to the invention allows a graduated reduction of the coefficients of thermal expansion differentials and of the chemical gradients, so that no elements diffuse out of the blade material or out of the material used for the rotor base into the joining zones.

According to another embodiment of the invention, it is finally provided for the adapter element to have a monolithic structure, whereby a material is employed whose composition comprises elements of the material used for the rotor blade as well as elements of the material used for the rotor base.

Preferably, the material used for the monolithic adapter element is a eutectic NiAl alloy containing chromium, molybdenum, rhenium and/or tantalum. Preferably, the eutectic NiAl alloy contains at least one of the following metals: tantalum, molybdenum and rhenium in an amount of 0.5% to 3% by weight as well as chromium in an amount of 5% to 7% by weight. An example of a composition is NiAl—$Ta_{2.5}$—$Cr_{5-7}$ (at %). Moreover, high temperature-resistant titanium trialuminides or two-phase materials based on TiAl and $TiAl_3$ having the general formula $M_3Ti_8Al_{22}$ or $M_{8-9}Ti_{25}Al_{66-67}$, wherein M stands for Cr, Mn, Fe, Co or Ni that crystallize in the cubic L1(2) structure, can all be used.

The monolithic adapter element can be produced from the NiAl alloy or the titanium trialuminides by means of conventional methods such as powder-metallurgy methods, casting, melting and forging as well as other shaping methods. Since the material used for the monolithic adapter element is compatible with the materials used for the rotor base and for the rotor blade, no diffusion of elements into the various joining zones occurs at the working temperature. Consequently, the structure of the joining zones remains essentially unchanged and no formation of brittle phases occurs.

The dimensions of the adapter element in all of the embodiments of the invention are preferably in the range from 15 mm to 55 mm in length, 5 mm to 25 mm in width and 5 mm to 20 mm in height.

Another subject matter of the invention is a method for the production of a hybrid component of a gas turbine, especially a blisk or bling, in which the rotor blade made of a titanium alloy is integrally joined by fusion to the rotor base made of a high temperature-resistant nickel alloy, whereby an adapter element is arranged between the rotor blade and the rotor base, said adapter element being made of a material that can be welded to the titanium alloy as well as to the high temperature-resistant nickel alloy.

The joining procedure is preferably friction welding.

BRIEF DESCRIPTION OF THE DRAWINGS

Advantageous refinements of the invention ensue from the subordinate claims and from the description below. Embodiments of the invention, which is not restricted to these embodiments, will be explained in greater detail with reference to the drawing. The drawing shows the following:

FIG. 4—a schematic view of the joining process for the production of the component according to the invention.

DETAILED DESCRIPTION

Figure 1:
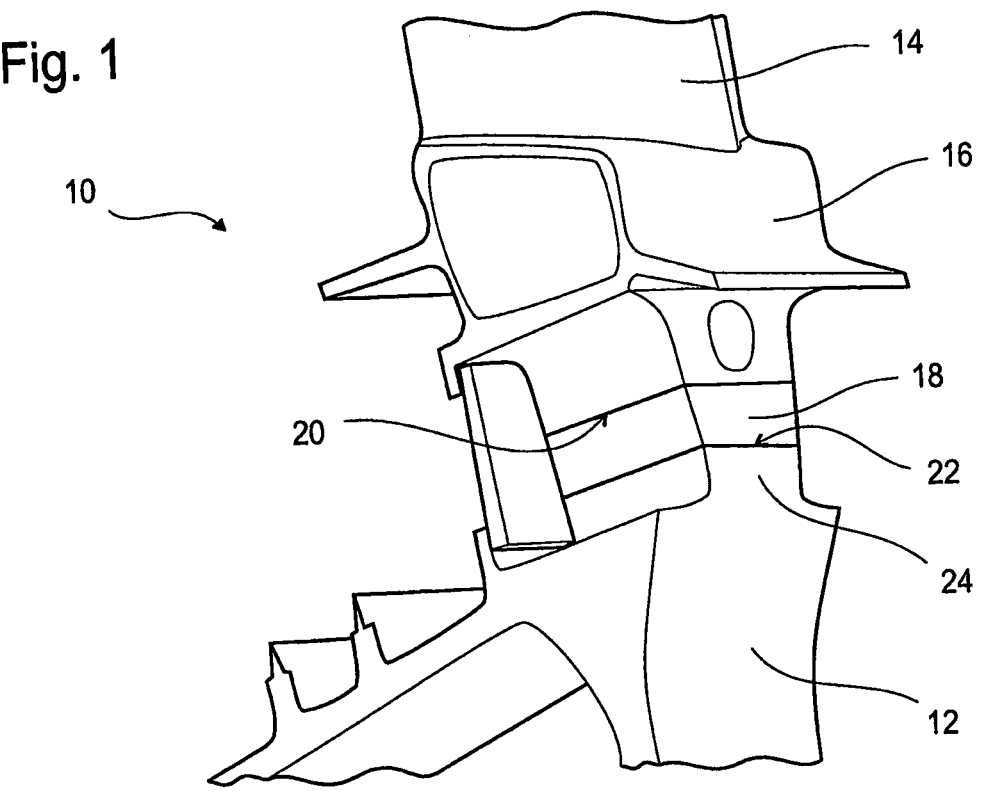
FIG. 1—a schematic view of the component according to the invention, with a rotor base, a rotor blade and an adapter element.

FIG. 1 shows a schematic view of a gas turbine rotor 10 preferably for a gas turbine of an aircraft engine, said turbine rotor being configured as a rotor with integrated blades. Accordingly, the gas turbine rotor 10 has a rotor base 12 as well as turbine blades 14, whereby the turbine blades 14 are an integral part of the rotor base 12.

Such a rotor with integrated blades is also referred to as a blisk (blade integrated disk) or as a bling (blade integrated ring), depending on whether the rotor base is disk-shaped or ring-shaped.

The rotor base 12 is made of a high temperature-resistant nickel alloy, preferably a nickel superalloy such as Inconel 718.

A plurality of turbine blades 14—only one of which is shown in FIG. 1—is joined to the rotor blade 12. The turbine blades 14 each comprise a rotor blade 16 made of a titanium alloy as well as a blade root that is configured as an adapter element 18.

The titanium alloy of the rotor blade 16 is preferably selected from the group of titanium-based alloys and of TiAl alloys. Preferably, the rotor blade 16 is made of a TiAl alloy containing titanium, aluminum and niobium at an aluminum content between 35% and 60% by weight and a niobium content ranging from 2% to 16% by weight. Special preference is given to the titanium alloy $Ti_{44}Al_5Nb$ (at %).

According to the invention, the adapter element 18 consists of a material that can be welded to the titanium alloy as well as to the high temperature-resistant nickel alloy. The adapter element 18 is integrally joined to the rotor blade 16 at the joining zone 20. At the opposite joining zone 22, the adapter element 18 is integrally joined to a pedestal 24 formed on the rotor base 12. The connection between the adapter element 18 and the rotor base 12 or the rotor blade 16 is done by means of joining, preferably in the form of friction welding.

Figure 2:
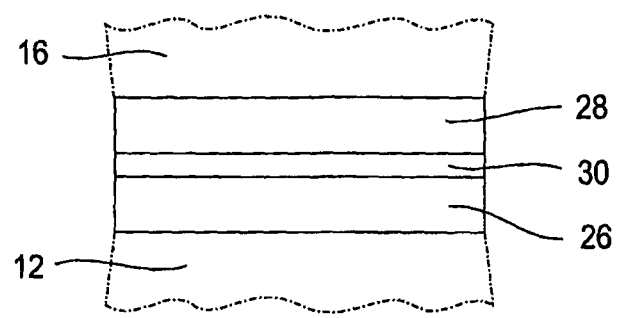
FIG. 2—a sectional view of the adapter element according to a first embodiment.

According to the embodiment shown in FIG. 2, the adapter element 18 has at least a first layer 26 consisting of the high temperature-resistant nickel alloy used for the rotor base 12, and at least a second layer 28 consisting of the titanium alloy used for the rotor blade 16. Between the first and the second layers, there is an interlayer 30 that functions as a diffusion barrier for elements that form brittle phases, especially aluminum. The interlayer 30 is integrally joined to the first and second layers 26 and 28, respectively. The first layer 26 adjoins the rotor base 12 while the second layer 28 adjoins the rotor blade 16.

The interlayer can be made up of a matrix mixed with metal particles and made of a high temperature-resistant nickel alloy such as, for example, Inconel 718 or a TiAl alloy. Preferably, the metal particles are particles of metal alloys. Especially preferably, the metal particles consist of refractory metal alloys and/or platinum metal alloys containing aluminum and a second metal from the group consisting of rhenium, iridium, ruthenium, platinum, tantalum, niobium, molybdenum and tungsten at an aluminum content between 2% and 60%. Another preferred composition of the metal particles comprises 2% to 40% by weight of aluminum, 5% to 20% by weight of a metal from the group consisting of nickel, cobalt, vanadium and chromium and, for the rest, another metal from the group consisting of rhenium, iridium, ruthenium, platinum, tantalum, niobium, molybdenum and tungsten.

The particles preferably have a mean size ranging from 0.1 μm to 200 μm and are uniformly distributed in the matrix alloy. Especially preferably, the metal particles are completely surrounded by the matrix alloy, so that no metal particles are present on the surface of the interlayer. The content of metal particles in the matrix alloy is preferably 5% to 45% by volume.

The thickness of the interlayer is preferably between 0.5 mm and 2 mm.

The adapter element having the interlayer 30 as the diffusion barrier is preferably made by sintering a powder made of the matrix materials and of the metal particles. In this context, the sintering can be carried out in any way known to the person skilled in the art, for example, employing lasers, electron rays or the direct passage of current, in each case with or without applying pressure. Layered sintering is likewise possible.

Figure 3:
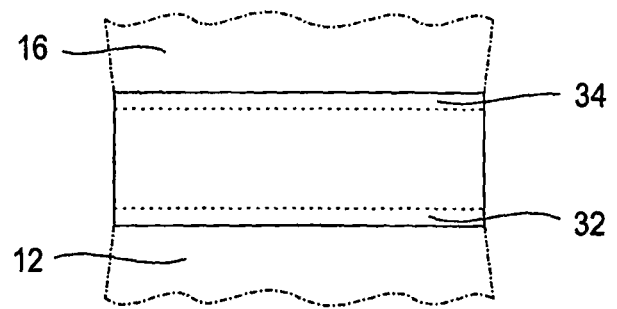
FIG. 3—a sectional view of the adapter element according to a second embodiment.

The embodiment shown in FIG. 3 depicts an adapter element 18 according to the invention having a graduated structure. In the surface layer 32 facing the rotor base 12, the adapter element 18 has a composition consisting of a nickel alloy such as Inconel 718 that matches the material used for the rotor base 12. In the surface layer 34 facing the rotor blade 16, the adapter element has a composition consisting of titanium alloy that matches the material used for the rotor blade such as, for instance, $Ti_{44}Al_5Nb$. Between the surface layers 32, 34, the composition of the adapter element changes continuously or gradually from the nickel alloy to the titanium alloy, that is to say, the nickel content decreases from the surface 32 in the direction of the surface 34, and the titanium content and/or the aluminum content increases in the same direction. Such a graduated adapter element can be produced, for example, by means of laser powder-deposit welding or other methods known in powder metallurgy.

According to another embodiment (not shown here), the adapter element 18 has a monolithic structure and is made of a material with a composition that comprises elements of the titanium alloy used for the rotor blade 16 as well as elements of the nickel alloy used for the rotor base 12.

Preferably, the material used for the monolithic adapter element 18 is a eutectic NiAl alloy containing chromium, molybdenum, rhenium and/or tantalum. Preferably, it is an alloy having the general formula NiAl—X—Cr, wherein X stands for at least one of the following metals: tantalum, molybdenum and rhenium. The amount of metal X preferably ranges from 0.5% to 3% by weight and the chromium amount lies between 5% and 7% by weight. An example of a composition is $NiAl$—$Ta_{2.5}$—$Cr_{5.7}$ (at %). Moreover, high temperature-resistant titanium trialuminides having the general formula $M_3Ti_8Al_{22}$ or $M_{8-9}Ti_{25}Al_{66-67}$, wherein M stands for Cr, Mn, Fe, Co or Ni that crystallize in the cubic L1(2) structure, can all be used. The monolithic adapter element 18 can be produced from the NiAl alloy or from the titanium trialuminide material by means of conventional methods such as powder-metallurgy methods, casting, melting and forging.

The production of the component according to the invention will be described below, making reference to FIG. 4.

FIG. 4 illustrates the method for joining components in the production or repair of a hybrid gas turbine rotor 10 having integrated blades, whereby the rotor blade 16 made of the titanium alloy is joined to the pedestal 24 of the rotor base 12 made of a nickel alloy.

In addition to the rotor base 12 and the rotor blade 16, which are to be integrally joined to each other, this method provides for an adapter element 18 which, according to the invention, consists of a material that can be welded to the titanium alloy as well as to the high temperature-resistant nickel alloy. The rotor blade 16, the rotor base 12 and the adapter element 18 are then oriented with respect to each other in such a way that the adapter element 18 is arranged between the pedestal 24 of the rotor base 12 and the rotor blade 16.

In order to join the rotor blade 16 to the rotor base 12, the adapter element 18 is moved back and forth translatorily or linearly with respect to the rotor base 12 and the rotor blade 16 as indicated by the double-headed arrow 36, wherein the rotor base 12 as well as the rotor blade 16 remain stationary. Additionally, an upset force, and thus an upset pressure, is exerted in the direction indicated by the arrows 38 and 40 via the stationary rotor base 12 as well as via the likewise stationary rotor blade 16 onto the joining zone 22 that is formed between the rotor base 12 and the adapter element 18 and onto the joining zone 20 located between the adapter element 18 and the rotor blade 16. This brings about hot forging in the area of the joining zones 20 and 22, with the formation of an integral joining of the turbine blade 14 to the rotor base 12, whereby the adapter element 18 forms the blade root of the turbine blade 14.

The adapter element 18 is preferably moved back and forth at a frequency in the order of magnitude between 10 Hz and 30 Hz, especially at a frequency of about 20 Hz, with respect to the stationary rotor base 12 and the likewise stationary rotor blade 16. The stroke of the adapter element 18 is in the order of magnitude between 0.1 mm and 3 mm, and preferably is about 2 mm. The upset force applied during the welding is 50,000 N at the maximum.

The invention claimed is:

1. A component for a gas turbine, comprising;
a rotor base made of a high temperature-resistant nickel alloy; and
a plurality of turbine blades joined to the rotor base, each turbine blade comprising a rotor blade made of a titanium alloy and a blade root, the blade root being configured as an adapter element made of a material weldable to the titanium alloy as well as to the high temperature-resistant nickel alloy and being integrally fused to the rotor base and to the rotor blade, the adapter element having at least a first layer of the high temperature-resistant nickel alloy, and at least a second layer of the titanium alloy, and at least an interlayer between the first and second layers as a diffusion barrier for elements that form brittle phases.

2. The component as recited in claim 1 wherein the titanium alloy is a titanium aluminum alloy.

3. The component as recited in claim 1 wherein the titanium alloy is a titanium aluminum alloy including titanium, aluminum and niobium.

4. The component as recited in claim 3 wherein the titanium aluminum alloy has an aluminum content between 35% and 60% by weight and a niobium content ranging from 2% to 16% by weight, the rest being titanium.

5. The component as recited in claim 1 wherein the nickel alloy is a nickel superalloy.

6. The component as recited in claim 5 wherein the nickel superalloy contains between 50% and 55% Ni, between 17% and 21% Cr, plus smaller fractions of Nb/Ta, Mo, Ti, Al as well as other trace elements and, for the rest, iron.

7. The component as recited in claim 1 wherein the interlayer is made up of a matrix alloy belonging to the group of nickel-based alloys, nickel superalloys and TiAl alloys with metal particles uniformly distributed in it.

8. The component as recited in claim 7 wherein the metal particles consist of an alloy containing 2% to 60% by weight of aluminum and, for the rest, at least another metal from the group consisting of rhenium, iridium, ruthenium, platinum, tantalum, niobium, molybdenum and tungsten.

9. The component as recited in claim 7 wherein the metal particles consist of an alloy containing 2% to 40% by weight of aluminum, 5% to 20% by weight of a metal from the group consisting of nickel, cobalt, vanadium and chromium and, for the rest, another metal from the group consisting of rhenium, iridium, ruthenium, platinum, tantalum, niobium, molybdenum and tungsten.

10. The component as recited in claim 1 wherein the component is a blisk or a bling.

11. A component for a gas turbine, comprising;
a rotor base made of a high temperature-resistant nickel alloy; and
a plurality of turbine blades joined to the rotor base, each turbine blade comprising a rotor blade made of a titanium alloy and a blade root, the blade root being configured as an adapter element made of a material weldable to the titanium alloy as well as to the high temperature-resistant nickel alloy and being integrally fused to the rotor base and to the rotor blade, wherein the adapter element has a graduated structure, and a composition of the adapter element changes from the material used for the rotor base to the material used for the rotor blade.

12. The component as recited in claim 11 wherein a titanium content of the adapter element gradually or continuously increases from a surface layer facing the rotor base in the direction of a further surface layer located on the opposite side and facing the rotor blade.

13. The component as recited in claim 11 wherein a nickel content of the adapter element gradually or continuously decreases from a surface layer facing the rotor base in the direction of a further surface layer located on the opposite side and facing the rotor blade.

14. A component for a gas turbine, comprising;
a rotor base made of a high temperature-resistant nickel alloy; and
a plurality of turbine blades joined to the rotor base, each turbine blade comprising a rotor blade made of a titanium alloy and a blade root, the blade root being configured as an adapter element made of a material weldable to the titanium alloy as well as to the high temperature-resistant nickel alloy and being integrally fused to the rotor base and to the rotor blade, wherein the adapter element is a monolithic adaptor made up of a eutectic NiAl alloy containing chromium, molybdenum, rhenium and/or tantalum.

15. The component as recited in claim 14 wherein the eutectic NiAl alloy is $NiAl-Ta_{2.5}-Cr_{5-7}$ (at %).

16. A component for a gas turbine, comprising;
a rotor base made of a high temperature-resistant nickel alloy; and
a plurality of turbine blades joined to the rotor base, each turbine blade comprising a rotor blade made of a titanium alloy and a blade root, the blade root being configured as an adapter element made of a material weldable to the titanium alloy as well as to the high temperature-resistant nickel alloy and being integrally fused to the rotor base and to the rotor blade, wherein the adapter element is a cubic titanium-aluminum material corresponding to the general formula $M_3Ti_8Al_{22}$ or $M_{8-9}Ti_{25}Al_{66-67}$, wherein M stands for Cr, Mn, Fe, Co or Ni.

17. A method for the production of a hybrid component of a gas turbine, comprising the step of: integrally joining by welding a rotor blade made of a titanium alloy to a rotor base made of a high temperature-resistant nickel alloy using an adapter element being arranged between the rotor blade and the rotor base, the adapter element being made of a material weldable to the titanium alloy as well as to the high temperature-resistant nickel alloy, the adapter element having at least a first layer of the high temperature-resistant nickel alloy, and at least a second layer of the titanium alloy, and at least an interlayer between the first and second layers as a diffusion barrier for elements that form brittle phases.

18. The method as recited in claim 17 wherein the welding is friction welding.

19. The method as recited in claim 17 wherein the component is a blisk or a bling.

* * * * *